United States Patent [19]
Faynshteyn et al.

[11] Patent Number: 5,944,868
[45] Date of Patent: Aug. 31, 1999

[54] PRODUCTION OF LIQUID FERTILIZERS BY ION EXCHANGE

[75] Inventors: Yelana (Helen) Faynshteyn, Tucson, Ariz.; Mark Clarkson, Phoenix, Ariz.

[73] Assignee: Tessenderlo Kerley, Inc., Phoenix, Ariz.

[21] Appl. No.: 09/014,608

[22] Filed: Jan. 28, 1998

[51] Int. Cl.$^6$ .................................................. C01B 17/64
[52] U.S. Cl. ................................. 71/31; 71/63; 71/64.1; 210/670; 210/681; 423/470; 423/514
[58] Field of Search ................. 71/64.1, 31, 63; 423/514, 470; 210/670, 681

[56] References Cited

U.S. PATENT DOCUMENTS

| | | | |
|---|---|---|---|
| 2,366,650 | 1/1945 | Rawlings et al. | 23/112 |
| 3,096,153 | 7/1963 | Hadzeriga | 23/121 |
| 3,622,268 | 3/1969 | Wada et al. | 23/22 |
| 4,210,437 | 7/1980 | Windgassen et al. | 423/514 |
| 4,321,235 | 3/1982 | Mouret et al. | 423/7 |
| 5,449,506 | 9/1995 | Berry et al. | 210/681 |

FOREIGN PATENT DOCUMENTS 240727  11/1986  Germany .............................. 423/514

*Primary Examiner*—Wayne Langel
*Attorney, Agent, or Firm*—Banner & Witcoff, Ltd.

[57] ABSTRACT

Ion exchange is used to make two grades of liquid fertilizer. In the first phase, ammonium thiosulfate (ATS) is contacted with a potassium-containing ion exchange resin to make the liquid fertilizer potassium thiosulfate (KTS) and an ammonium-containing resin. If operated under ambient temperatures, oxidation of any sulfites and the attendant formation of insoluble sulfates is avoided along with the associated fouling costs.

The recharge line is operated in parallel to the KTS line. When the ammonium-containing resin is contacted with potassium chloride, the ammonium cations are exchanged for potassium cations and produce an ammonium chloride that can be used as a second liquid fertilizer. If desired, a concentrator can be used to remove water from each fertilizer to increase its concentration of KTS or ammonium chloride.

10 Claims, 1 Drawing Sheet

PRODUCTION OF LIQUID FERTILIZERS BY ION EXCHANGE

FIELD OF THE INVENTION

A process that produces potassium thiosulfate by ion exchange.

BACKGROUND OF THE INVENTION

Potassium thiosulfate ($K_2S_2O_3$-KTS) is a good liquid fertilizer and is used on soil, on foliage, or by injection through an irrigation system for commodity crops including corn and soybeans. At a 1:1 stoichiometric ratio, KTS has the highest K+S value of any liquid fertilizer.

Potassium thiosulfate is usually made by one of two processes. One common process involves contacting ammonium thiosulfate (($NH_4)_2S_2O_3$-ATS) with potassium hydroxide (KOH) under elevated conditions. The other process uses sulfur dioxide ($SO_2$) made from relatively inexpensive refinery off gases, contacts the gas with potassium hydroxide solution, and reacts the $SO_2$/KOH solution with sulfur.

Unfortunately, both of these processes are prone to a number of practical problems. One is that potassium hydroxide is a fairly expensive reagent whose market value fluctuates, often significantly (between about $200–$300/ton), in relation to the demand for chlorine. A second is the environmental risks associated with $SO_2$ gases. The third problem with the conventional synthesis processes is the undesirable oxidation of sulfites that form sulfate solids that are not soluble in KTS and precipitate inside the pipes of the reactor system. The solids ultimately plug the lines and require extensive maintenance that offset the reduced cost of the sulfur source gases. Precipitated sulfate solids also require that the product be filtered before it can be packaged for sale to a customer. The filter and its maintenance represent additional undesired processing costs. A fourth drawback is the need to locate the KTS plant next to a refinery for capture of the refinery off gases.

It would be beneficial to have a method for making potassium thiosulfate that did not require the use potassium hydroxide as the potassium source.

It would be desirable to have a manufacturing process for potassium thiosulfate that did not use environmentally difficult $SO_2$ gas, did not require filtration before packaging, and could be located in areas other than next to a petroleum refinery.

It would also be advantageous to have a manufacturing process that could operate at ambient to slightly elevated temperatures and thereby avoid the energy costs associated with heating systems to allow the reaction to proceed at a commercially viable rate.

SUMMARY OF THE INVENTION

It is an object of the present invention to provide a process that formed potassium thiosulfate in acceptable levels of purity without forming sulfate solids.

It is a further object of the invention to provide a process for making potassium thiosulfate that does not require filtration before being packaged for sale.

In accordance with these and other objects of the invention that will become apparent from the description herein, a process for making liquid KTS fertilizers according to the invention comprises the steps of: (a) contacting ammonium thiosulfate with a potassium-containing ion exchange resin under conditions sufficient to form a potassium thiosulfate product and an ammonium-containing resin without forming significant amounts of sulfate precipitates; and (b) recovering said potassium thiosulfate product. If the recharge circuit is operated with potassium chloride, the resin is recharged and produces an ammonium chloride product that is also useful as a liquid fertilizer. Concentrators can be used to remove water from the fertilizer products and increase the concentration of active fertilizing components.

The present process can be performed at ambient temperatures, avoids the use of costly KOH and environmentally sensitive gases, and produces a product that does not require filtration before packaging. The net result is a commercially saleable KTS fertilizer product that is significantly less expensive to manufacture than the KTS products made with KOH as a primary reagent.

DETAILED DESCRIPTION

Figure 1:
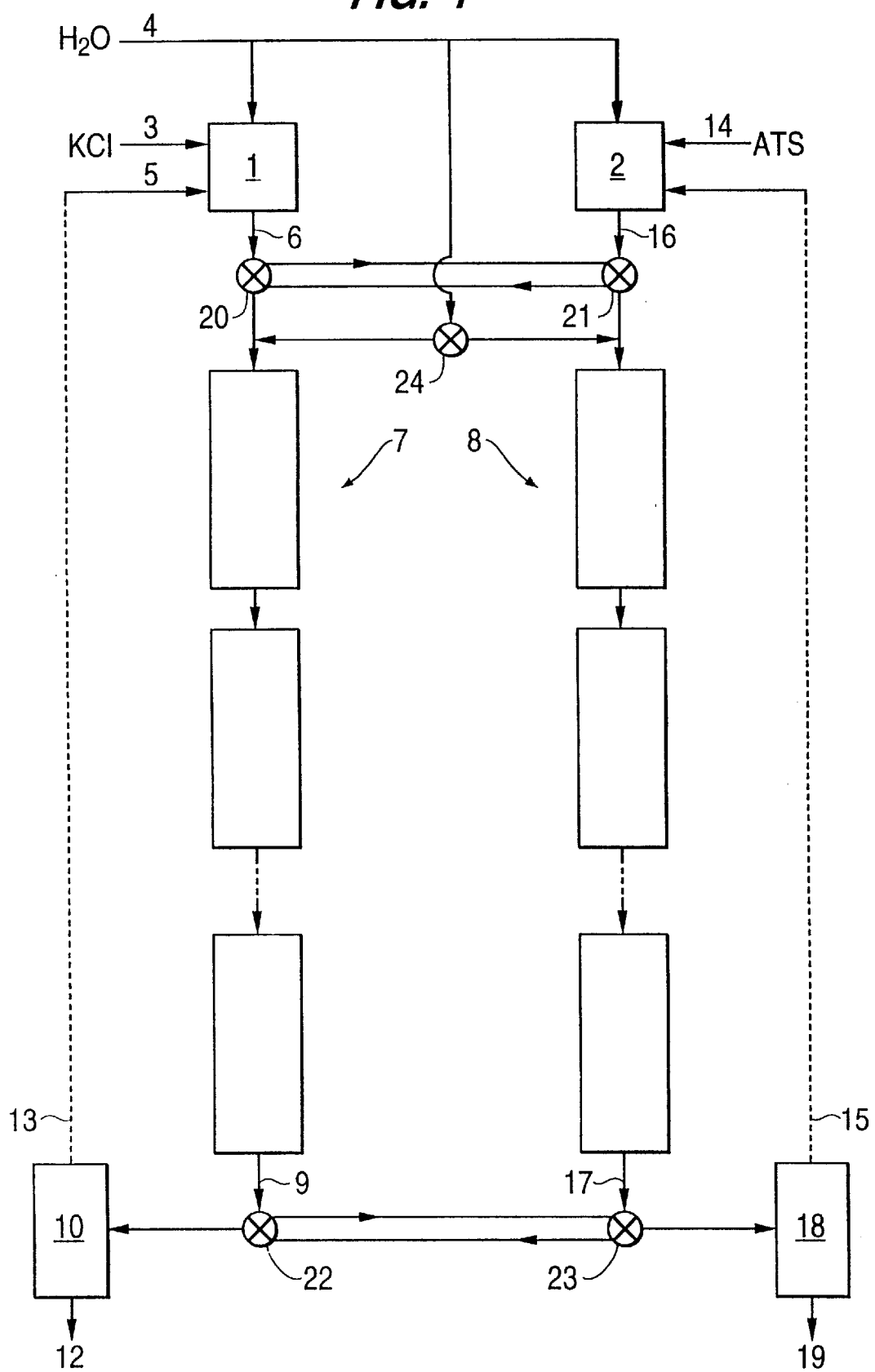
FIG. 1 is a block diagram illustration of the present process.

Potassium thiosulfate is made by exchanging the ammonium cation in ammonium thiosulfate for potassium ions in a regenerable, potassium-loaded ion exchange resin under conducive ion exchange conditions. The resulting KTS product is packaged as a liquid fertilizer product either with or without an intermediate concentration step. The ammonium-laden resin is regenerated to its potassium form by contact with a solution of potassium chloride under suitable ion exchange conditions. The ammonium chloride solution produced by the regeneration step can be used as a lower grade liquid fertilizer. The present process thus makes two fertilizers of different grades for valuable production on each phase of the ion exchange process cycle.

The ion exchange contacting is performed at conditions effective to result in an exchange of ions between the resin and the supernatant solution. Additionally, the exchange of potassium from the resin to the thiosulfate anion is also performed at a temperature that is sufficiently low to avoid formation of significant amounts of insoluble sulfate compounds that could foul the piping. Such sulfate precipitates often come from oxidation of sulfites byproducts formed in the process.

Preferably, the ion exchange to make potassium thiosulfate is performed at a temperature within the range from about 10° C. to about 35° C., and most preferably at an ambient temperature within a range from about 15° C. to about 30° C. The ion exchange temperature ranges for regenerating the resin and forming ammonium chloride are generally the same as those used for the ion exchange. In a particularly preferred embodiment, the resin is charged with 20% potassium chloride at ambient temperature. Generally, the total content of $K^+$ charged to the system should be 1.25 times higher than the total capacity of the resin.

The ion exchange resin can be either a cation exchange resin or an anion exchange resin in one or a more exchange columns. Generally, cation exchange resins are preferred for their higher capacities.

The ion exchange system preferably uses a plurality of discrete ion exchange resin column beds disposed in serial, cascading flow relation. In particular, the resin is conveniently used in 2–40 columns operating in two groups of 1–20 serially disposed columns for staggered exchange and regeneration sequences. Appropriate valves and control systems that are within the existing skill of the art can be used to control the switchover from a column sequence operating in exchange mode to operation in regeneration mode. When properly performed, the ion exchange batch operation can be operated as a substantially continuous process.

Higher levels of KTS purity are attainable with increasing numbers of consecutive exchange beds to some number at equilibrium where additional beds do not result in an increased purity. Two sets of 15 beds in sequence produce a KTS product with roughly 2% ATS.

The reagents used for the present process can be of virtually any grade or quality. Of course, more pure starting materials will produce products of generally higher levels of purity. In general, particularly good results are seen with an ATS solution containing 10–65 wt % (preferably 50–65%) ATS at a feed rate within the range of 0.25–3 LHSV (liquid hourly space velocity) and a regenerating solution containing 10–25 wt % KCl at a feed rate within the range of 0.5–5 LHSV.

Depending on the number of discrete ion exchange beds and the efficiency of the regeneration process, the final KTS product stream can contain some minor amounts of ATS as an impurity. Although certain levels can affect treated plants if applied as a foliar fertilizer, application of the KTS fertilizer product of the invention to soil at rates consistent with traditional application rates of KTS will not pose phytotoxicity or other adverse effects. If a foliar application product is desired, the KTS product stream can be purified of ATS by adding a small amount (i.e., 0.01–2 wt %) of KOH to the product stream to react with any residual ATS and form product KTS. Such a subsequent "cleaning" process does not use nearly the levels of KOH used previously in connection with conventional ATS manufacturing processes and is not correctly equated with a conventional KTS manufacturing process.

The process of the invention is conveniently described with reference to the attached FIG. 1. In that figure, tank 1 operates in parallel with tank 2. Tank 1 is used to mix and meter solid KCl source 3 with water 4 and KCl wash water stream 5 to make KCl regeneration solution 6 that is used to regenerate ion exchange resin in exchangers 7 and 8. Effluent 9 from the regeneration and subsequent wash phases contains ammonium chloride, some KCl, and excess water. Effluent 9 is passed to evaporator/separator 10 for separating ammonium chloride product stream 12 and dilute KCl stream 13. The dilute KCl stream 13 can be recycled to tank 1 for making regeneration solution 6.

On the exchange side, concentrated ammonium thiosulfate 14 is combined with water 4, and dilute ATS stream 14 to make exchange solution 16. Solution 16 is then passed through the appropriate ion exchange set of columns to produce KTS in a concentration that is as high as economically feasible. Exchanger lines 7 and 8 can each be made of virtually any number of individual ion exchange units operated serially to produce the product KTS. In general, each exchange sequence can be made of 1–10 discrete exchange units with the effluent of one becoming the feed for the subsequent unit. Ultimately, exchange effluent 17 and the subsequent wash waster is passed to a second evaporator/separator 18 to separate and concentrate KTS product stream 19. The dilute ATS stream 15 can be recycled to tank 2 for reuse.

Valves and appropriate controls are used to switch the ion exchange column modes from regenerate to exchange, and vice versa. For example, valves 20–23 are used in conjunction with wash valve 24 to selectively pass KCl regeneration solution 6 through exchange columns 7, ATS exchange solution 16 through columns 8, and pass wash water through both columns 7 and 8 to remove adsorbed and entrained materials.

EXAMPLES

Example 1

The co-manufacture of KTS and ammonium chloride was performed in a single ion exchange column (500 mm×41 mm). Ammonium thiosulfate (20 wt %) was passed through a column containing 210 ml of K+ DOWEX MONOSPHERE 650C cation ion exchange resin. The potassium and ammonium cations were exchanged to produce potassium thiosulfate (KTS) in a purity of 10.7% and 7.8% ATS.

Regeneration of the resin to the K+ form was performed by passing a 9.6 wt % KCl solution through the column. The eluted solution contained 5.6% KCl and 2.2% $NH_4Cl$. The resin bed was then washed with 315 ml water. The wash water contained 0.9% KCl.

Example 2

The exchange process of example 1 was expanded to 8 columns operating in two batches of 4 serially linked columns. The table below shows properties of the final products. (Please note that the form of compound used as the basis for calculation is indicated in parentheses.)

| Product | [K+] (g/l) | [K− salt] (wt %) | [NH$_4^+$] (g/l) | [NH$_4^+$ salt] (wt %) |
|---|---|---|---|---|
| KTS/ATS | 61.78 | 13.48 (KTS) | 6.68 | 2.46 (ATS) |
| NH$_4$Cl/KCl | 1.832 | 0.35 (KCl) | 18.66 | 5.42 (NH$_4$Cl) |

The elute from the ion exchange and regeneration modes contain acceptable levels of valuable potassium and nitrogen concentrations that are commercially saleable as fertilizers. The process has run maintenance-free for at least 13 runs, and the overall cost of manufacture is roughly 40% less than the cost for KTS product made with a conventional KOH process. The reagent cost, and final product cost, are also independent of fluctuations in the market price for KOH.

Example 3

Pilot tests were performed using two, 15 column sequences. Regeneration solution was pumped through the off line sequence in a direction opposite the flow of reactants to make a countercurrent flow system. The columns were washed between operational stages, i.e., producing KTS v. producing ammonium chloride in regeneration. The product had the following specifications:

| | |
|---|---|
| Specific Gravity | 1.4885 at 65° F. |
| pH | 7.50 |
| Alkalinity | 0.39% KOH |
| Assay | 48.47% wt % (by iodine titration) |
| Sulfite | 1.07 wt % $SO_3^{2-}$ |
| K2O | 24.21 wt % (based on K+ concentration, determined by AA) |
| S | Based on $SO_3^{2-}$, determined by iodine titration) |
| Ammonia | 130–160 ppm |

We claim:
1. A process for making a liquid potassium fertilizer by ion exchange, said process comprising:

contacting ammonium thiosulfate with a potassium-containing ion exchange resin under conditions sufficient to form a potassium thiosulfate product and an ammonium-containing resin without forming significant amounts of sulfate precipitates, and recovering said potassium thiosulfate product.

2. A process according to claim 1 wherein said process further comprises:

concentrating said potassium thiosulfate product by removing water therefrom.

3. A process according to claim 1 wherein the contacting of ammonium thiosulfate with a potassium-containing ion exchange resin occurs in a plurality of serially disposed resin columns.

4. A process according to claim 3 wherein the contacting is alternately performed in two parallel sets of 1–20 columns.

5. A process according to claim 1 further comprising:

regenerating said ammonium-containing resin by contacting said resin with a solution containing potassium ions under conditions sufficient to form ammonium chloride and a potassium-containing resin; and recovering said ammonium chloride.

6. A process for making liquid potassium and ammonium fertilizers by ion exchange, said process comprising the steps of:

contacting ammonium thiosulfate with a potassium-containing ion exchange resin to form potassium thiosulfate and an ammonium-containing resin at a temperature within the range from about 10° C. to about 35° C. under conditions sufficient to avoid formation of significant amounts of sulfate precipitates; and recovering said potassium thiosulfate;

regenerating said ammonium-containing resin by contacting said resin with a solution containing potassium ions under conditions sufficient to form ammonium chloride and a potassium-containing resin; and recovering said ammonium chloride.

7. A process according to claim 6 wherein said process further comprises:

concentrating said potassium thiosulfate product by removing water therefrom.

8. A process according to claim 6 wherein the contacting of ammonium thiosulfate with a potassium-containing ion exchange resin occurs in a plurality of serially disposed resin columns.

9. A process according to claim 8 wherein the contacting is alternately performed in two parallel sets of 1–20 serially disposed columns.

10. A process according to claim 6 wherein the contacting step and the regenerating step of said process is performed at an ambient temperature within the range from about 15° C. to about 30° C.

* * * * *